INVENTOR
JOHN P. CAPPS
BY
Carpenter, Abbott, Coulter & Kinney
ATTORNEYS

INVENTOR
JOHN P. CAPPS
BY
Carpenter, Abbott, Coulter & Kinney
ATTORNEYS

United States Patent Office 3,355,743
Patented Nov. 28, 1967

3,355,743

ELECTROGRAPHIC RECORDING APPARATUS HAVING A POROUS CARRIER WEB FOR ELECTROSCOPIC PRINT POWDER

John P. Capps, Newport News, Va., assignor to Minnesota Mining and Manufacturing Company, St. Paul, Minn., a corporation of Delaware Continuation of application Ser. No. 4,258, Jan. 25, 1960. This application Nov. 29, 1963, Ser. No. 328,777
5 Claims. (Cl. 346—74)

ABSTRACT OF THE DISCLOSURE

Electrographic recording apparatus having point scanning electrodes forming a print gap, a thin porous carrier web positioned in the print gap, means for driving the carrier web through the print gap, means for applying print powder to the carrier web, means for feeding sheet material through the print gap, and means for impressing modulated high voltage signals across the scanning electrodes. Also corresponding electrographic recording process.

This invention relates to electrographic recording apparatus and to a method for the reproduction of images, impulses or the like. In one aspect it relates to a simple, dry method for the reproduction of facsimile images on ordinary paper. This is a continuation of Ser. No. 4,258 filed January 25, 1960, now abandoned.

The image which is transmitted in a facsimile system is scanned, e.g. by a flying spot scanner, in the transmitter, usually by photoelectric means, and the resulting image impulses are transmitted by means of transmission wires or by means of wireless transmission. The image impulses are amplified in the receiver and are conducted to a printer device comprising scanning electrodes, for example, a printer spiral and a suitably controlled printer bar. The printer spiral and the printer bar are disposed of in the plane of the line to be printed and extended over the entire width of the printing paper. The term "printer line" or, briefly, "line" is used in the following discussion to mean a line that has been scanned once or, in other words, a printed line that extends over the effective printing width of the recording paper. Although various types of scanning electrodes have been used, in conventional page-printing facsimile recorders, it is customary to provide a cylindrical drum upon which is mounted an exposed helix wire, and a thin metal printer bar which extends across the full width of the recording page or drum. The marking signal fed between the printer bar and the helix wire is thus available across the whole surface width, and the recording "spot" consists of the intersection between the printer bar and the helix wire. The helix containing drum rotates synchronously with the transmitting scanner so that the "spot" or point of intersection between the printer bar and helix wire moves along the length of the printer bar, and thus across the page, in unison with the transmitter scanning motion, with each marking signal increment passing through the recording paper at the proper point as the paper is positioned between the printer bar and helix wire, often referred to as "horizontal synchonization." "Vertical synchronization" is provided by moving the recording paper over the printer bar at the same rate as the transmitter's rate of vertical scanning. Such a helix-type page-printing facsimile recorder is described in U.S. 2,872,276 and U.S. 2,415,229.

Currently available apparatus for the direct printing of facsimile images employs in most cases a specially treated or prepared paper, e.g. electrochemically moistened paper, paper which has been color treated by spark discharge, etc. Such papers are expensive, are often inconvenient to used and occasionally tend to lose their effectiveness upon aging.

Some facsimile recording systems have attempted to use ordinary paper by employing inks and smoke particles but the problem of cost, smudging, and the cumbersome and complex nature of the apparatus have remained serious disadvantages. Other systems, such as that described in U.S. 2,879,422, use writing paper, but require a cathode ray tube to develop an electrostatic charge thereon and subsequent visible development of the image by well-known electrostatic developing techniques.

It is therefore an object of this invention to provide a simple apparatus for the reproduction of facsimile images or other electrical impulse information.

It is a further object of this invention to provide a simple apparatus for the simultaneous reception and visible reproduction of facsimile images and other electrical impulse information.

Another object of this invention is to provide a dry process for the simultaneous reception and visible reproduction of facsimile images and the like.

Still another object of this invention is to provide an improved method for the permanent and instantaneous reproduction of a transmitted facsimile image on ordinary paper.

Various other objects and advantages will become apparent from the accompanying description and from the drawings wherein.

Figure 1:
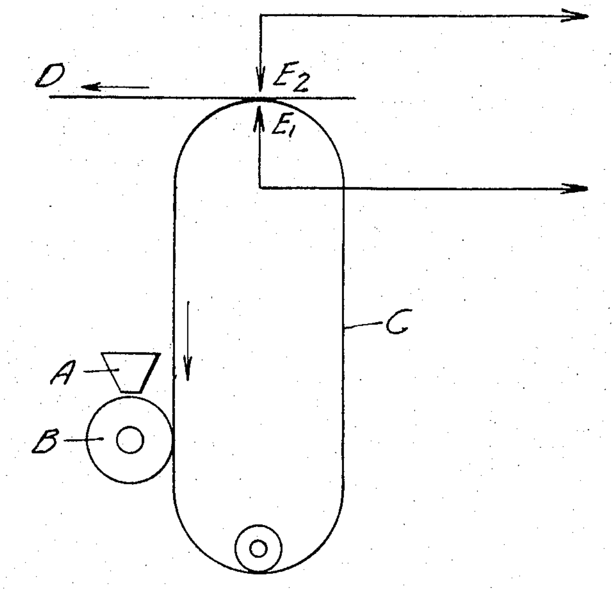
FIGURE 1 is a schematic drawing of the electrographic reproduction apparatus or recorder.

In accordance with my invention the foregoing and other objects are accomplished by providing, as schematically shown in FIGURE 1, an electrical impulse recording apparatus having electrodes $E_1$ and $E_2$ forming a print gap therebetween, a carrier web C capable of bearing electroscopic powder positioned in the print gap adjacent one of said electrodes, means for driving the carrier web through the print gap and means for simultaneously feeding sheet material D, such as ordinary paper, through the print gap. Electroscopic powder is supplied to the carrier web C by means such as roll B and powder hopper A.

In accordance with one embodiment of my invention the foregoing and other objects are accomplished by a system wherein a rotatable cylindrical drum containing a helix wire on the periphery thereof is positioned in an adjustable spaced relationship adjacent to a printer bar aligned parallel to the longitudinal axis of said drum, a continuous movable carrier web or matrix containing particulate marking material is disposed between said drum and said printer bar, means are provided for effecting the rotation of said cylindrical drum at a predetermined speed, means are provided both for feeding paper at various predetermined speeds between said drum and said printer bar and also for simultaneously moving said carrier web in juxtaposition with said paper in the direction of and at the speed of said paper, and means are provided for impressing the high voltage electrical impulses corresponding to the facsimile or other transmitted signals across the print gap existing between said printer bar and said helix wire on said drum. For purposes of description the print bar and helical wire wound drum will be considered illustrative of preferred "scanning electrodes," although other types of electrodes, including fixed electrodes, can be used.

Figures 2, 3:
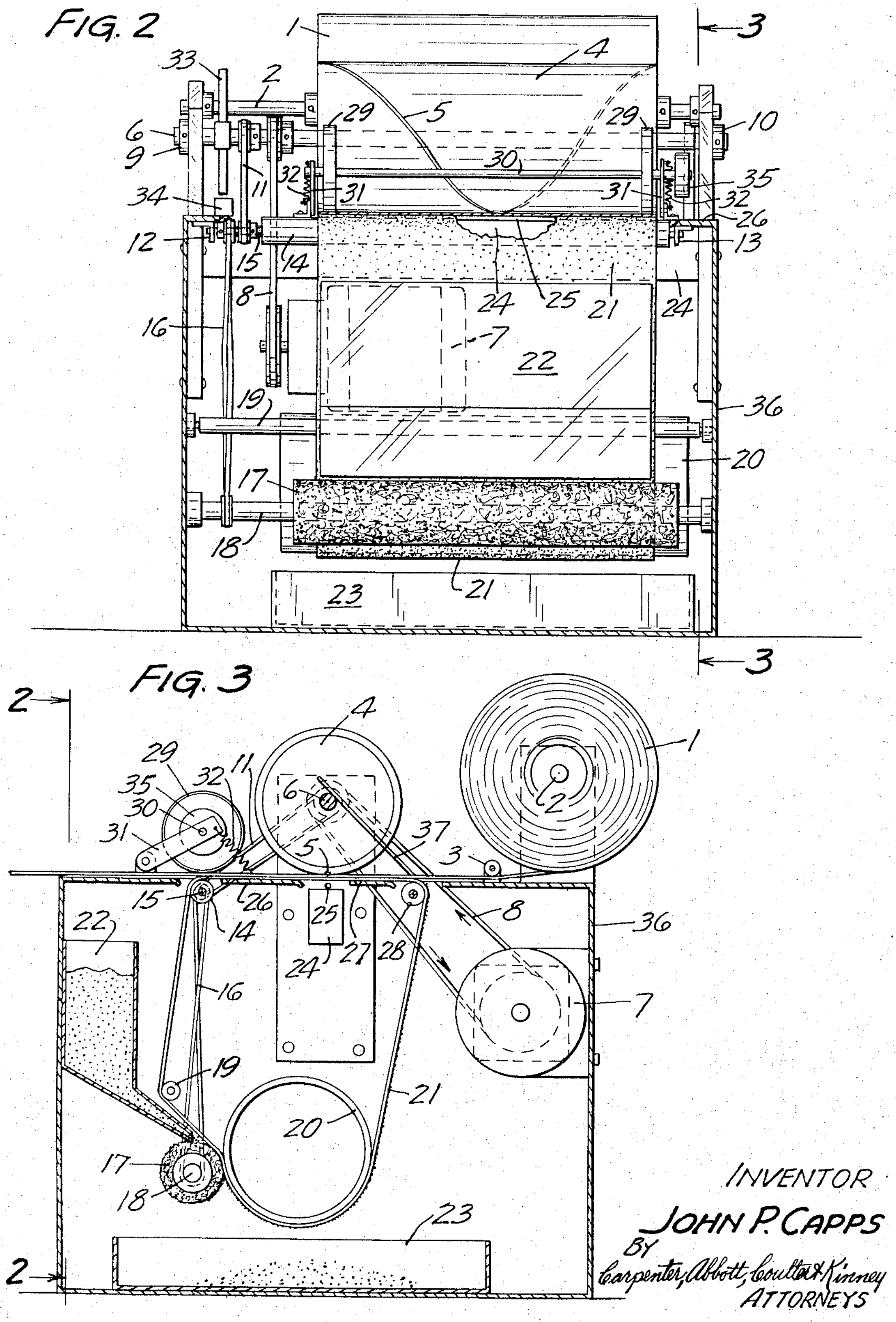
FIGURE 2 is a front view of a preferred embodiment of the facsimile reproduction or recording apparatus, taken along line 2—2 of FIGURE 3.
FIGURE 3 is a cross-sectional view of the apparatus of FIGURE 2 approximately along line 3—3.

With reference to the embodiment shown in FIGURES 2 and 3, the image reproducing apparatus is provided with a support 2 for holding a freely rotatable roll of paper 1. The paper from roll 1 is passed under paper guide roller 3 and thence across the top surface of metal housing 36. Rotatable drum 4 containing helical wire 5 and printer bar mount 24 containing printer bar 25 are similar to the customary type employed in page-printing facsimile recording. The amplified facsimile impulses are impressed as varying or modulated high voltages between the printer bar 25 and the helical wire 5, the latter being grounded to the metal housing 36 through the rotatable axis 6 of drum 4 and the ground strip 37. End bearings 9 and 10 support shaft 6 of drum 4, which shaft is driven by belt drive 8 from motor 7. A belt take-off 11 from driven shaft 6 supplies power for rubber coated paper advance roller 14. Rubber-faced wheels 29 on axle 30 are connected to metal housing 36 by means of movable lever arms 31 and are maintained, through appropriate openings in the top surface of housing 36, in pressural contact with paper advance roller 14 by means of springs 32. A continuous carrier web or matrix 21 passes over carrier web supports 26 and 27, over paper advance roller 14 and carrier web guide rolls 19 and 28. Tension roll 20 rides freely on carrier web 21 at the lowest point of its travel and maintains the desired tension on the web. Print powder is supplied to the carrier web 21 by means of a felt surfaced dusting roller 17, which receives powder from hopper 22 and transfers it to carrier web 21 during its clockwise rotation about axis 18. Rotation of axis 18 and dusting roller 17 is effected by a belt take-off from paper advance roller 14. Drop pan 23 is disposed beneath the point of contact between the carrier web and the dusting roller to collect such print powder as may drop from the dusting roller during the dusting operation.

In the operation of the above-described apparatus the paper from roll 1 is brought into contact with the top surface of the print powder-bearing carrier web 21 as it passes over guide roll 28. Both carrier web and paper, while in juxtaposition with one another, preferably in a contiguous relationship, move over support 27, between the printer bar 25 and the rotating drum 4, over support 26, and hence between paper advance roller 14 and compression wheel 29. The driven rotation of paper advance roller 14 thus effects and regulates the forward motion of the paper and the carrier web at a speed synchronized with the vertical scanning rate of the transmitter. As the paper and carrier web pass through the "print gap" between printer bar 25 and the rotating drum 4, the amplified electrical impulses or high voltage impulses corresponding to the facsimile signals are impressed between the printer bar and the helical wire 5, thereby producing an electrostatic field of force therebetween. Such high potentials and the resulting electrostatic fields cause the particles contained on the carrier web to transfer to the adjacent paper where they are retained both by the electrostatic charge developed thereon and by the ingraining of the particles into the paper. The width of the "print gap" is preferably kept at a minimum to provide highest resolution and definition.

For purposes of this invention the sheet material employed to receive the print powder may be any ordinary paper, such as sulfite paper or may be fabric or plastic sheets. However, in order to reduce the danger of smearing and smudging or to obviate the necessity for a "fixing" operation, a relatively porous or rough surfaced material is preferred, and paper is most preferred. The continuous carrier web or belt 21 is made from any relatively thin, flexible material to which the print powder can be loosely adhered either in the interstices of such porous materials as cellulosic and other non-woven mesh or fabric, natural and synthetic fabrics, paper, etc., or to the surface of such relatively non-porous materials as synthetic plastic sheets, etc. Generally, porous or rough surfaced materials of minimal thickness are preferred.

Any finely divided electroscopic powder, i.e. a powder capable of bearing an electrical charge, can be used as the print powder. Selection of a particular powder naturally is dependent on the color desired. Such electroscopic powders as those employed in the xerographic art are particularly suitable. One preferred powder which produces dense black markings is manganese oxide ($MnO_2$). Illustrative of other powder materials are iron oxide (red), chromium oxide (green), and pigments such as ultramarine blue, with or without added fillers or carriers. Fillers and colorants may, of course, be added, and certain materials, such as diatomaceous clay, can be incorporated into the powder composition to improve its adherence to the carrier web.

As mentioned earlier, the facsimile impulses are amplified and are impressed across the "print gap" between the print bar and rotating drum as a high voltage, the actual operating voltage selected depending on such factors as the actual width of the "print gap," the porosity of the paper to be printed, the nature of the carrier web, etc. It has been found that the electroscopic print powders, such as manganese oxide, can be more readily transferred from the carrier web to the paper at a given strength of electrostatic field if the field is pulsated rather than maintained at a constant potential gradient, although such pulsation is not essential to obtain the desired result. Generally, pulsating D.C. voltages of the order of magnitude of 5000 to 10,000 volts or higher, preferably above about 10,000 volts, have been found to be satisfactory.

The electrical polarity of the print bar and the helical wire in the rotating drum is usually, though not necessarily, selected with regard to the electroscopic or charge characteristics of the print powder. Hence, for example, when a powder having an electronegative charge is used as print powder in the above-described apparatus, the helical wire of the rotating drum is preferably positive with respect to the print bar. Some suitable xerographic powders contain a pigmented resin, specially formulated to provide a high electronegative charge in the triboelectric series and to permit fusing or "fixing" at a temperature which will not damage the paper, and a beaded carrier which provides a high charge at the electropositive end of the triboelectric series. Applicant has found that the metal oxide powders, particularly manganese oxide, can be used in the above apparatus without regard to the respective polarities of the print bar and the helical wire. It is believed that the electroscopic particles in the carrier web assume the charge of the electrode adjacent to, i.e. in closest proximity to, the carrier web, are then repelled therefrom and are projected into the paper, which probably is oppositely charged to some extent by the other electrode. In spite of the possible theoretical explanation therefor, any electroscopic powder capable of bearing an electrical charge can be employed in the instant invention, and factors such as polarity, width of the "print gap," electrical potential, etc. can be readily adjusted to produce optimum results. Moreover, provision may be made for precharging the electroscopic particles, if desired.

Figure 4:
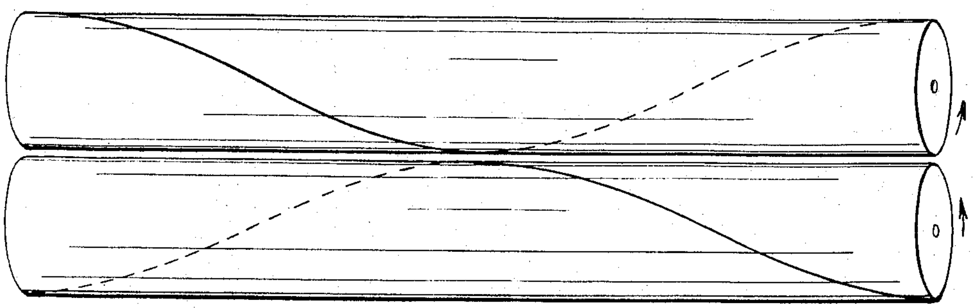
FIGURE 4 is a perspective view of an alternative embodiment of the helix type electrodes.

In place of the stationary print bar described above, a rotating drum having a helical wire mounted on the exterior thereof, similar to rotating drum 4, can be employed. This helical wire should be wound about the drum in a direction opposed to that of the wire on drum 4 such that it intersects or passes adjacent to the helical wire in drum 4 at a single point in the "print gap," which point moves transversely across the paper in synchronization with the scanning rate of the transmitter. Such an embodiment tends to provide a more clearly defined intersection between the electrodes or points of applied electrical potential and to increase the clarity of the resulting image. This embodiment is shown in FIGURE 4.

The speed of rotation of the helical wire wound drum or drums is adjusted to provide a horizontal scanning rate similar to that of the transmitter. Such speed can be further regulated by varying the diameter of the drum or by utilizing a helical wire or wires of varying degrees of pitch. When more than one helical wire is wound on the drum the pitch or progression of the wires should be such as to provide only one point of contact on any longitudinal surface line drawn parallel to the axis of said drum, thereby to permit only one scanning point per line at any given time.

The above embodiments of the process and apparatus of this invention have been shown and described for purposes of explaining and illustrating the invention, obvious modifications will occur to a person skilled in the art and it is not intended to limit the invention to the exact details shown and described herein.

I claim:

1. In a helix-type page-printing facsimile recorder containing a rotatable scanner drum having a helical wire on the periphery thereof and a printer bar disposed in parallel relationship to the axis of rotation of said drum and forming a print gap therebetween, the improvement which comprises, in combination, a continuous thin, porous carrier web positioned in said print gap, said carrier web having interstices and being capable of loosely bearing an electroscopic powder in said interstices, means for driving said carrier web through said print gap, means for applying print powder to said carrier web before passing through said print gap, means for feeding sheet material through said print gap in juxtaposition with said carrier web, and means for impressing a modulated high voltage potential across said print gap.

2. In an electrographic recording apparatus having point scanning electrodes forming a print gap therebetween, the improvement which comprises, in combination, a thin, porous carrier web having interstices and being positioned in said print gap, means for driving said carrier web through said print gap, means for applying print powder onto said carrier web and into the interstices thereof before passing through said print gap, means for feeding sheet material through said print gap, and means for continuously impressing modulated high voltage signals directly across said electrodes.

3. In a facsimile recording apparatus having point scanning electrodes forming a print gap therebetween, the improvement which comprises, in combination, a thin, porous continuous carrier web positioned in said print gap adjacent one of said electrodes, said carrier web having interstices and being capable of loosely bearing an electroscopic powder in said interstices, means for driving said carrier web through said print gap, means for feeding sheet material through said print gap in juxtaposition with said carrier web, means for applying print powder to said carrier web, before passing through said print gap and means for continuously impressing high voltage facsimile signals directly across said scanning electrodes.

4. In a helix-type page-printing facsimile recorder containing a rotatable scanner drum having a helical wire on the periphery thereof and a printer bar disposed in parallel relationship to the axis of rotation of said drum and forming a print gap therebetween, the improvement which comprises, in combination, a thin, porous continuous carrier web having interstices and being positioned in said print gap, means for driving said carrier web through said print gap, means for applying print powder onto said carrier web and into the interstices thereof before passing through said print gap, said carrier web being capable of loosely bearing an electroscopic powder, means for feeding sheet material through said print gap in juxtaposition with and contiguous with said carrier web, and means for impressing a pulsating high voltage potential above about 10,000 volts D.C. across said print gap.

5. In a helix-type page-printing facsimile recorder containing a rotatable scanner drum having a helical wire on the periphery thereof and a printer bar disposed in parallel relationship to the axis of rotation of said drum and forming a print gap therebetween, the improvement which comprises, in combination, a thin, porous continuous carrier web having interstices and being positioned in said print gap, means for driving said carrier web through said print gap, means for applying print powder onto said carrier web and into the interstices thereof before passing through said print gap, said carrier web being capable of loosely bearing an electroscopic powder, means for feeding sheet material through said print gap in juxtaposition with and contiguous with said carrier web, and means for impressing a pulsating high voltage potential above about 10,000 volts D.C. across said print gap.

References Cited

UNITED STATES PATENTS

| | | | |
|---|---|---|---|
| 2,817,767 | 12/1957 | Rosenthal | 346—74 |
| 2,890,923 | 6/1959 | Huebner | 346—74 |
| 2,901,374 | 8/1959 | Gundlach | 346—74 |
| 2,932,690 | 4/1960 | Adams | 178—6.6 |

BERNARD KONICK, *Primary Examiner.*

L. J. SCHROEDER, *Assistant Examiner.*